July 29, 1958 T. E. DADSON 2,845,517
RANGE
Filed July 12, 1956
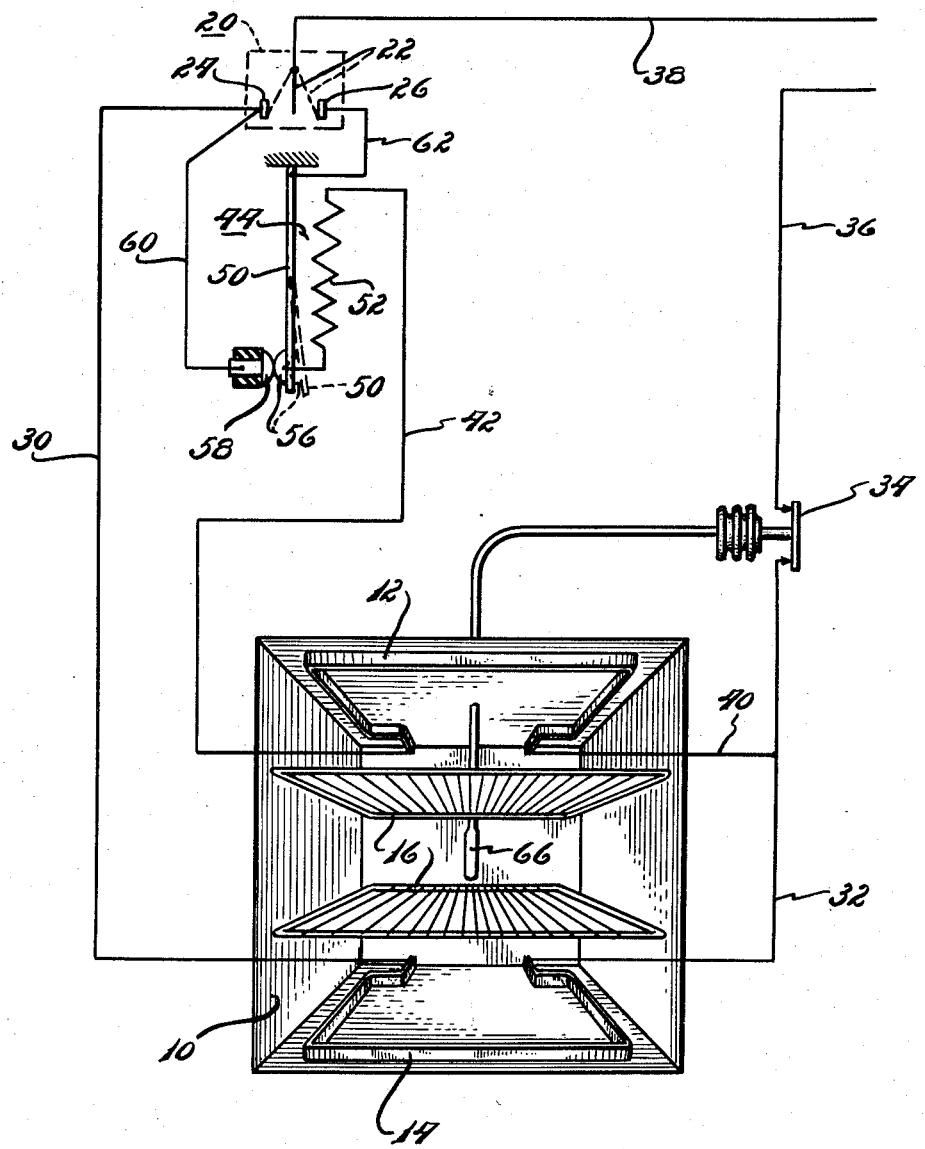
INVENTOR.
THOMAS E. DADSON
BY
Ralph E. Baker
ATTORNEY

United States Patent Office 2,845,517
Patented July 29, 1958

2,845,517
RANGE

Thomas E. Dadson, Franklin, Mich., assignor to American Motors Corporation, Detroit, Mich., a corporation of Maryland Application July 12, 1956, Serial No. 597,546

3 Claims. (Cl. 219—20)

This invention relates to ranges and more particularly to an electric oven heating system adaptable for such ranges.

It is an object of the present invention to provide in an electric oven heating system having upper and lower heating units, an improved simple electro-thermal control that connects the upper heating unit cyclically in a bake circuit arrangement with the continuously connected lower heating unit both under the control of a thermostat.

It is another object of the present invention to provide a simplified improved control for an electric oven having plural heating units providing an automatic change from bake to broil circuit arrangement.

It is another object of the present invention to provide in an electric oven having a plurality of heating units in bake circuit connections, an improved arrangement wherein one of the heating units provides auxiliary heating in a proportionate addition to the other heating unit by controlling the time interval in the sequences of connecting and disconnecting in bake circuit arrangement the heating unit.

Further objects and advantages of the present invention will be apparent from the following description, reference being had to the accompanying drawings, wherein a preferred form of the present invention is clearly shown.

The figure in the drawing is a wiring diagram embodying features of my invention with a perspective illustration of an oven chamber.

Shown in the drawing is an oven chamber 10 having an upper heating element 12 and a lower heating element 14. The heating elements 12 and 14 are preferably heating units of the sheathed type employing highly compressed insulating material completely embedding the wires. The insulating material provides a thermal mass for storing residual heat which continues to radiate after the current has been interrupted, or shut off. The heating element 12 is placed in close proximity adjacent the top wall of the oven chamber and is preferably used when broiling is desired. In broiling the food is placed on a shallow pan (not shown) set on a shelf 16 positioned beneath and in close proximity to the upper heating element 12 with the door of the oven in opened or partially opened position. The lower heating element 14 is preferably positioned adjacent the bottom wall of the oven chamber and serves to heat the oven chamber when in general use, as for baking, roasting, and the like.

To select the heating elements for use there is provided a manually operated selective switch 20 having a switch arm 22 adapted for selectively engaging contact 24 or 26. The contact 24 is connected by wire or conductor 30 to one terminal of lower heating element 14, the opposite terminal of the heating element is connected by conductor 32 to a thermostatically controlled switch 34. The thermostatically controlled switch 34 is connected by a conductor 36, which together with conductor 38 connects to a suitable source of electrical energy or power. The conductor 38 connects to the switch arm 22.

The upper heating element 12 is connected in circuit with the conductors 36, 38 through the thermostatically controlled switch 34, conductors 32 and 40 to a terminal of the heating element 12, the other terminal connects by conductor 42 to a thermostatic switch indicated in general by numeral 44, which connects to the contacts 24, 26 of the selective switch 20.

The thermostatic switch 44 comprises a bimetal strip 50 with which is associated in proper thermal relation a heater coil 52. One end of the bimetal strip 50 is secured in a fixed stationary position and its opposite end is free to warp or flex carrying therewith a contact point 56. The contact point 56 is adapted to engage a stationary contact point 58 which is connected by conductor 60 to contact 24 of the selective switch 20. The other contact 26 is interconnected by conductor 62 to the bimetal strip 50 which serves as an electrical conductor to carry the current to contact 56. The contact 56 is interconnected in series circuit by heater coil 52 and the conductor 42 with the upper heating element 12. When the switch 20 is in "off" position, engaging neither contact 24 nor 26, and the bimetal strip 50 is cold, the contact points 56, 58 are in engagement.

The thermostatically controlled switch 34 is provided with a thermo-sensitive element 66 positioned within the oven chamber 10 to actuate the switch 34 in response to the air temperature within the oven chamber. The thermostatically controlled switch is preferably of the type that permits adjustment by the user to preselect a desired temperature which the control is to maintain. This type of control is well known and used extensively at the present time. If desired, the thermostatically operated switch 34 and the selective switch 20 may be combined and arranged to be operated by a single control knob (not shown).

When the oven chamber 10 is desired for baking, roasting or the like, the user sets the switch 20 whereby switch arm 22 engages contact 24, and adjusts the thermostatically controlled switch 34 to a desired temperature setting to which temperature the air within the oven chamber is to be heated and maintained. A circuit with the power source is closed from conductors 38, 30 to the lower heating element 14, through the conductor 32, the thermostatically controlled switch 34 and the conductor 36. A parallel circuit is closed to the upper heating element 12 from the contact 24 through the conductor 60, the contacts 58, 56, the heater coil 52, and the conductor 42 to the heating element 12 and therefrom through the conductor 40 to the thermostatically controlled switch 34. Both heating elements 12, 14 are connected to the power source to function together to heat the circulating air within the oven chamber under the control of the thermostatically operated switch 34 which will interrupt the current flow to both heat elements when the air temperature attains a predetermined value, and recloses the circuit simultaneously to both heating elements when the air cools below a predetermined temperature value.

As the current to the upper heating element flows through the heater coil 52, the heat generated by the resistance to the current flow will radiate to the bimetal strip 50 which when sufficiently heated, will flex carrying contact point 56 out of engagement with contact point 58 to interrupt the current flow through both the heater coil 52 and the upper heating element 12. Upon cooling the bimetal strip 50 will return to normal position reengaging contact points 56, 58 to reclose the circuit to heater element 12, whereupon the heater coil 52 will again operate to heat the bimetal strip to provide an intermittent on and off circuit to the upper heating element. The upper heating element will continue to operate intermittently to the continuous operation of the lower heating element in accordance to the heating needs as controlled by the thermostatically controlled switch 34 as long as the oven is in use.

The circuit to the upper heating element through heater coil 52 is one that permits full wattage input to the heating element for the period of current flow. By its intermittent operation it will have an average wattage input which is less than from continuous operation so that its heat output will be equal to the auxiliary top heating necessary to be added to the heat output from the lower heating element 14 to uniformly balance the heat within the oven chamber to permit temperatures throughout the chamber. As full current flows through the upper heating element during the "on" cycle, the thermal mass about the wire will prevent flash heating into the oven chamber by storing some of it as residual heat, whereupon the mass during "off" cycle will continue to radiate heat into the oven chamber until cooled, or until the next "on" cycle. Thus the thermal mass of the heating unit serves to smooth or even out the impulses of applied energy into a relatively even heat output.

By this circuit arrangement any average watts input may be had to provide any desired auxiliary top heating merely by varying the time cycle of the upper heating element, that is, the period the element is "on" and "off" which is determinal from the heating and cooling cycle of the bimetal 50 and the heater coil 52. The limitation is only the maximum heat output of the upper heating element and any variable is obtainable to the maximum by a change of bimetal strip 50, or heater coil 52, or both to vary their heating and cooling time. A fast heating and slow cooling of the bimetal strip would provide short "on" cycle and a long "off" cycle, whereas a reverse would be true if the bimetal heated slowly and cooled rapidly. If desired, some variation may be obtained upon the operation of the bimetal strip 50 by associating therewith adjustment screws and springs (not shown) to vary its movement.

When the oven chamber is desired for broiling, the selective switch 20 is actuated to move the arm 22 against contact 26 closing a circuit from conductor 38 through conductor 62, the bimetal strip 50, the heater coil 52, the conductor 42, to the upper heating element 12 and therefrom by the conductor 40 and the thermostatically controlled switch 34 to the conductor 36. The thermostatically controlled switch 34 is normally closed with a cold oven chamber, and during the broil operation of the upper heating element 12 the thermostatically controlled switch will remain closed unaffected by the heat from heating element 12 as the door to the oven chamber is generally and preferably left open or partially opened for air to circulate freely into and out of the oven chamber so that the general temperature within the chamber never rises to a value about the thermo-sensitive element 66 where it will actuate the control switch 34. As the current flows to the upper heating element it will also flow through the normally closed contacts 56, 58, conductors 60, 30 to the lower heating element 14 and therefrom through the conductor 32 and the thermostatically controlled switch 34 to the conductor 36 in a parallel circuit. The heat from the heater coil 52 will effect a heating of the bimetal strip 50 to cause the bimetal to bow or flex carrying contact 56 out of engagement from contact 58 to break the circuit to the lower heating element 14. Thereafter the heater coil 52, in continuous series circuit with the upper heating element 12, will continue to continuously heat the bimetal strip 50 to maintain the bimetal so that the contacts 56 and 58 remain separated. The bimetal strip 50 may be of the type having a relatively low resistance to current flow to be unaffected thereby and to be solely responsive to the heat from the heater coil 52, or if desired, be of the type having a high resistance to current flow so as to cause inherent heating which combined with the heat from the heater coil will effect a more rapid bowing for a more rapid or quicker separation of the contacts 56 and 58. Upon completion of the broiling operation the switch 20 is actuated to "off" position whereupon the switch arm 22 will be disengaged from either contact 24 or 26. With the current off, the heater coil 52 and the bimetal strip 50 will be permitted to cool allowing the bimetal strip 50 to return to normal position with contact 56 against contact 58.

Although only a preferred form of the invention has been illustrated, and that form described in detail, it will be apparent to those skilled in the art that various modifications may be made therein without departing from the spirit of the invention or from the scope of the appended claims.

I claim:

1. An electric oven heating system comprising a lower heating element, an upper heating element, power mains, circuit connections connecting one terminal of said lower heating element to said power mains, a selector switch connected to said power mains, said selector switch having a first contact and a second contact, circuit connections connecting said first contact with the other terminal of said lower heating element, a stationary contact, circuit connections connecting said stationary contact with said first contact, a bi-metallic strip having a fixed end and a movable end movable upon the application of heat to said strip, circuit connections connecting said fixed end with said second contact, a movable contact in engagement with said stationary contact and carried by the movable end of said strip, a heater coil positioned in heat exchange relation with said bi-metallic strip, circuit connections connecting one end of said heater coil to the movable end of said strip and to said movable contact providing a series circuit connection between said strip and said heater coil, circuit connections connecting the other end of said heater coil in series circuit relationship with one terminal of said upper heating element and circuit connections connecting the other terminal of said upper heating element to said power mains.

2. An electric oven heating system comprising a lower heating element, an upper heating element, power mains, circuit connections connecting one terminal of said lower heating element to said power mains, a selector switch connected to said power mains, said selector switch having a first contact and a second contact, circuit connections connecting said first contact with the other terminal of said lower heating element, a stationary contact, circuit connections connecting said stationary contact with said first contact, a bi-metallic strip of low resistance having a fixed end and a movable end movable upon the application of heat to said strip, a movable contact in engagement with said stationary contact and carried by the movable end of said strip, circuit connections connecting said movable contact with said second contact, a heater coil positioned in heat exchange relation with said bi-metallic strip, circuit connections connecting one end of said heater coil to said movable contact, providing a series circuit connection between said stationary and movable contacts and said heater coil, circuit connections connecting the other end of said heater coil in series circuit relationship with one terminal of said upper heating element, circuit connections connecting the other terminal of said upper heating element to said power mains, and a thermostatic switch connected to said power mains.

3. An electric oven heating system comprising a lower heating element, an upper heating element, power mains, circuit connections connecting one terminal of said lower heating element to said power mains, a switch connected to said power mains, said switch having a contact, circuit connections connecting said contact with the other terminal of said lower heating element, a stationary contact, circuit connections connecting said stationary contact with said switch contact, a bi-metallic strip having a fixed end and a movable end movable upon the application of heat to said strip, a movable contact in engagement with said stationary contact and carried by the movable end of said strip, a heater coil positioned in heat exchange relation with said bi-metallic strip, circuit connections connecting one end of said heater coil to said movable contact providing a series circuit connection between said stationary and movable contacts and said heater coil, circuit connections connecting the other end of said heater coil in series circuit relationship with one terminal of said upper heating element, circuit connections connecting the other terminal of said upper heating element to said power mains, and a thermostatic switch connected to said power mains.

References Cited in the file of this patent

UNITED STATES PATENTS

| | | |
|---|---|---|
| 2,103,560 | Smith et al. | Dec. 28, 1937 |
| 2,122,650 | Keene | July 5, 1938 |
| 2,421,953 | MacKendrick | June 10, 1947 |
| 2,434,467 | McCormick | Jan. 13, 1948 |
| 2,480,470 | Hulbert | Aug. 30, 1949 |
| 2,790,056 | Fry | Apr. 23, 1957 |
| 2,804,531 | Dadson | Aug. 27, 1957 |